(12) United States Patent
Henriot (10) Patent No.: US 7,814,087 B2
(45) Date of Patent: Oct. 12, 2010

(54) METHOD OF HIERARCHICAL SEARCHING ON A CONDITIONAL GRAPH

(75) Inventor: Charles Henriot, Paris (FR)

(73) Assignee: LASCOM, Bievres (FR)

( * ) Notice: Subject to any disclaimer, the term of this patent is extended or adjusted under 35 U.S.C. 154(b) by 398 days.

(21) Appl. No.: 11/944,548

(22) Filed: Nov. 23, 2007

(65) Prior Publication Data

US 2008/0154862 A1    Jun. 26, 2008

(30) Foreign Application Priority Data

Nov. 23, 2006    (FR) .................................. 06 10373

(51) Int. Cl.
    *G06F 17/30*    (2006.01)
(52) U.S. Cl. ....................... 707/708; 707/711; 707/737; 707/741
(58) Field of Classification Search ................. 707/1–5, 707/10, 100, 104.1; 717/154, 151, 152
    See application file for complete search history.

(56) References Cited

U.S. PATENT DOCUMENTS

| 6,292,938 | B1 * | 9/2001 | Sarkar et al. ................. | 717/138 |
| 7,171,407 | B2 * | 1/2007 | Barton et al. .................. | 707/4 |
| 7,580,918 | B2 * | 8/2009 | Chang et al. ................... | 707/2 |

OTHER PUBLICATIONS

Ernesto Damiani, et al., "A Fine-Grained Access Control System for XML Documents", XP-002289531, ACM Transactions on Information and System Security, vol. 5, No. 2, May 2002, pp. 169-202.

Irini Fundulaki, et al., "Specifying Access Control Policies for XML Documents with XPath", XP-002446721, Proc. of The Ninth ACM Symposium on Access Control Models and Technologies (SACMAT '04), Jun. 2-4, 2004, pp. 61-69.
Stephane Bressan, et al., "Accelerating queries by pruning XML documents", XP-004906292, Data & Knowledge Engineering, vol. 54, No. 2, Aug. 2005, pp. 211-240.
Makoto Murata, et al., "XML Access Control Using Static Analysis", XP-002446588, Proc. of The 10th ACM Conference on Computer and Communications Security (CCS'03), Oct. 27-31, 2003, pp. 73-84.
Jean-Francois Boulicaut, et al., "Using Constraints During Set Mining: Should We Prune or not?", http://citeseer.ist.psu.edu/boulicaut00using.html, XP-002446589, Oct. 2000, pp. 1-15.

* cited by examiner

*Primary Examiner*—Cam-Linh Nguyen
(74) *Attorney, Agent, or Firm*—Oblon, Spivak, McClelland, Maier & Neustadt, L.L.P.

(57) ABSTRACT

The invention relates to a fast method of hierarchical searching for data satisfying at least one set of predetermined criteria C, in a directed acyclic graph which is stored in a relational database management system able to be interrogated by a query language, the criteria being determined on the nodes and/or the links of the graph. Each criterion is determined blocking (respectively non-blocking) that is to say such that as soon as the criterion is not satisfied, its descendant nodes are excluded, (respectively only this node is excluded, without consequence to its descendant nodes).
It comprises the following steps consisting in:
  separating the set C into a set of blocking criteria $C_b$ and non-blocking criteria $C_{nb}$
  searching by means of the query language for the nodes of the graph satisfying the set of blocking criteria $C_b$, these nodes being grouped together in a set G,
  searching by means of the query language, for the nodes of G satisfying the set of non-blocking criteria $C_{nb}$.

6 Claims, 5 Drawing Sheets

Figure 1

| Identifier (ID) | Reference | Caption |
|---|---|---|
| 1 | Surveillance Helicopter | Surveillance Helicopter |
| 2 | Engine Piston | Engine Piston |
| 3 | Transport Helicopter | Transport Helicopter |
| 4 | SH Cabin | Surveillance Helicopter Cabin |
| 5 | SH Commercial Folder | Surveillance Helicopter Commercial Folder |
| 6 | TH Cabin | Transport Helicopter Cabin |
| 7 | EP Technical Folder | Engine Piston Technical Folder |
| 8 | SHC Technical Folder | Surveillance Helicopter Cabin Technical Folder |

Figure 2a

| Identifier (ID) | Parent ID | Child ID | Confidential | Type | Caption |
|---|---|---|---|---|---|
| 1 | 1 | 2 | ☒ | Hardware | (1→2) |
| 2 | 1 | 5 | ☒ | Documentary | (1→5) |
| 3 | 1 | 4 | ☑ | Hardware | (1→4) |
| 4 | 3 | 2 | ☒ | Hardware | (3→2) |
| 5 | 3 | 6 | ☒ | Hardware | (3→6) |
| 6 | 2 | 7 | ☒ | Documentary | (2→7) |
| 7 | 4 | 8 | ☒ | Documentary | (4→8) |

| identifier (ID) | Link ID | Node ID | Caption | Confidential | Type | Index by interval | Index by path |
|---|---|---|---|---|---|---|---|
| 1 | - | - | Dummy root node | ☒ | H. | [1-22] | 1 |
| 2 | - | 1 | Surveillance Helicopter | ☒ | H. | [2-13] | 1/2 |
| 3 | 2 | 5 | SH Commercial Folder | ☒ | D. | [3-4] | 1/2/3 |
| 4 | 3 | 4 | SH Cabin | ☑ | H. | [5-8] | 1/2/4 |
| 5 | 7 | 3 | SHC Technical Folder | ☒ | D. | [6-7] | 1/2/4/5 |
| 6 | 1 | 2 | Engine Piston | ☒ | H. | [9-12] | 1/2/6 |
| 7 | 6 | 7 | EP Technical Folder | ☒ | D | [10-11] | 1/2/6/7 |
| 8 | - | 3 | Transport Helicopter | ☒ | H. | [14-21] | 1/8 |
| 9 | 4 | 2 | Engine Piston | ☒ | H. | [15-18] | 1/8/9 |
| 10 | 6 | 7 | EP Technical Folder | ☒ | D. | [16-17] | 1/8/9/10 |
| 11 | 5 | 6 | TH Cabin | ☒ | H. | [19-20] | 1/8/11 |

METHOD OF HIERARCHICAL SEARCHING ON A CONDITIONAL GRAPH

TECHNICAL FIELD

The field of the invention is that of hierarchical searches in a directed graph ("Directed Acyclic Graph" or DAG) which is stored in a relational database.

More precisely this involves searching through the DAG, for the data which satisfy a predetermined set of criteria C.

BACKGROUND OF THE INVENTION

It is recalled that a graph is a set of nodes and links between these nodes, representing data. A path is a series of links traversed in the same sense such that each link of the series has an end in common with the previous link. A cycle is a path in which a node appears at least twice.

Figure 1:
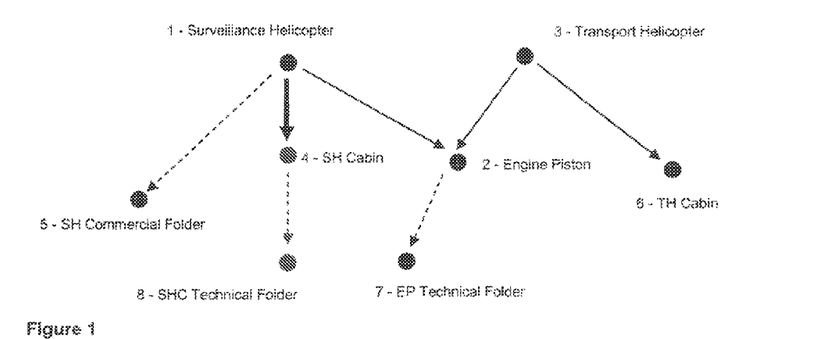
FIG. 1 schematically represents an exemplary directed acyclic graph (DAG)

A DAG, an example of which is presented in FIG. 1, is a graph all of whose links are directed and which has no cycle. So as to make it possible to perform searches in a DAG by means of a computer system, the DAG is stored in a relational database management system or DBMS designed to carry out such searches by using an interrogation language such as the SQL language. This DBMS comprises a set of tables representing the data and links of the DAG; for each node it catalogues the set of child nodes. An example of tables associated with the DAG of FIG. 1 is represented with a table of nodes in FIG. 2a, a table of links in FIG. 2b. The nodes table comprises an identifier field, a reference field and a field entitled data; the links table comprises an identifier field, a field for the identifier of a parent node, that of a child node, two property fields, in this instance "Confidential" and "Type", and a field entitled link. The identifiers of the parent and child nodes arise from the identifiers of the nodes table.

Hereinafter, a node designates a row of the nodes table, a link designates a row of the links table.

Figure 2A:
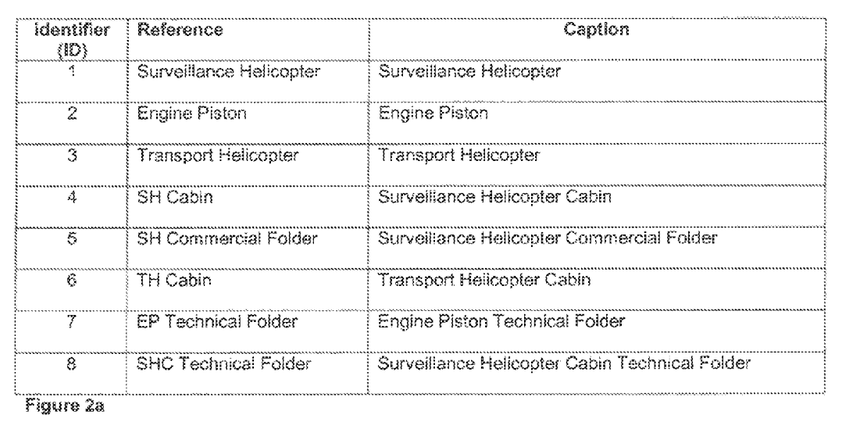
FIGS. 2a and 2b represent the tables of nodes and of links of the DAG of FIG. 1 in the database, FIG. 3 schematically represents a conventional computer system, FIG. 4 schematically represents the main steps of the method according to the invention.
Figure 2B:
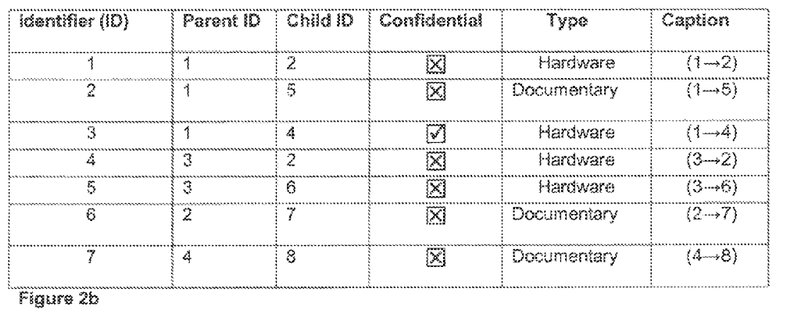

A search is carried out on the basis of a set of criteria. When the nodes and/or links are subject to one or more criteria, the graph is designated a conditional directed acyclic graph or CDAG. A criterion is expressed on the fields of a link or of a node: a criterion on a field is true or false. In the example of FIGS. 2, there is no criteria on the nodes, but "the 'Type' field is 'Documentary'" is a criterion on the links. The criteria are determined prior to interrogating the CDAG. These criteria are defined as a function of the rights of the connected user (for example, he has access to nonconfidential data only) or of a search formulated by this user (the user searches for documentary data).

In FIG. 1, the "documentary" links are represented by a dashed arrow, the "hardware" links by a solid arrow and the "confidential" links by a bold arrow. The arrow of the link 1-4 is a bold solid arrow since furthermore, for this link, the "Confidential" field is true.

A computer system which uses CDAGs must be able to interrogate the descendants of a given node as a function of a set of criteria. The set of descendants of a base node are the nodes for which there exists a path which links this base node to each of these nodes.

It is known to perform, on a database associated with a CDAG, searches on the data satisfying a set of predetermined criteria C, by recursivity. To search for all the descendants of a node, all the children of the node considered whose links correspond to the criteria C are actually interrogated, then this is repeated for each of its children and so on and so forth. A search then breaks down into a variable number of interrogations on the relational database. The number of these iterative or recursive interrogations cannot be known in advance, it depends on the number of data and of levels of the graph and on the set of criteria C. The performance degrades as the depth of the graph increases.

In the example of the graph of FIG. 1, the queries of the search for the descendants of the Surveillance Helicopter, all of whose links are "nonconfidential", are the following:

1. Query on all the "nonconfidential" children of the Surveillance Helicopter; the result is the Engine Piston, and the SH Commercial Folder. The SH Cabin is therefore not returned.
2. Query on all the "nonconfidential" children of the Engine Piston; the result is the EP Technical Folder.
3. Query on all the "nonconfidential" children of the SH Commercial Folder; no node in the result.
4. Query on all the "nonconfidential" children of the EP Technical Folder; no node in the result.

Thus the nodes of the result are the Surveillance Helicopter, the SH Commercial Folder, the Engine Piston and the EP Technical Folder.

The number of queries and therefore the duration of this search increase considerably for significant data volumes. For example, there may be more than a thousand queries for a search on a graph of a thousand elements.

It also increases all the more for thorough searches. As examples of thorough searching may be cited those which consist in crossing one search with another, or in sorting the results of the search as in the case of pagination, etc. Pagination consists for example in identifying the 80th element and the next 30 in the list of elements of the result.

Figure 3:
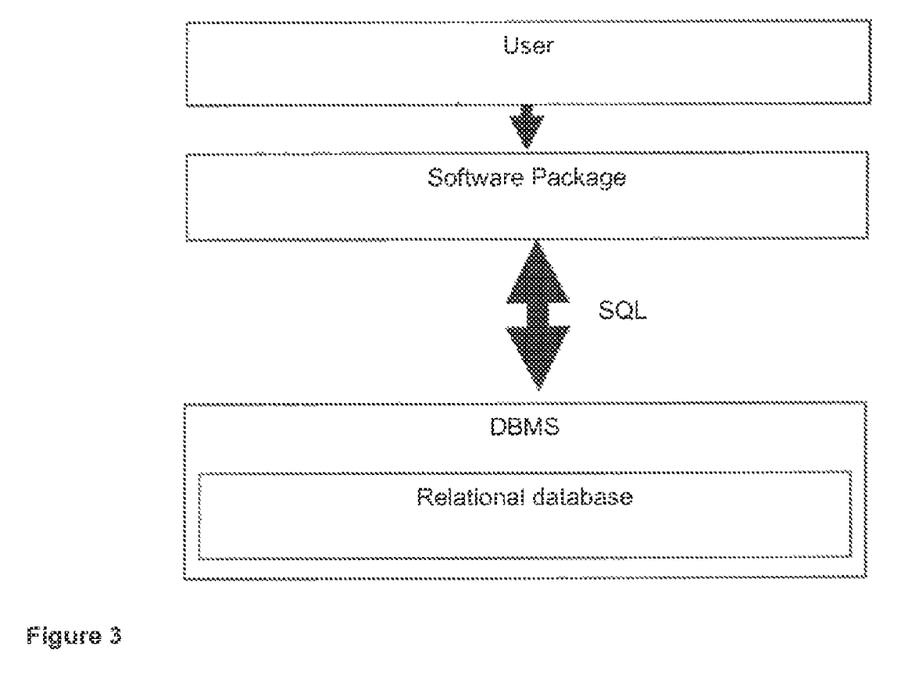
Figure 4:
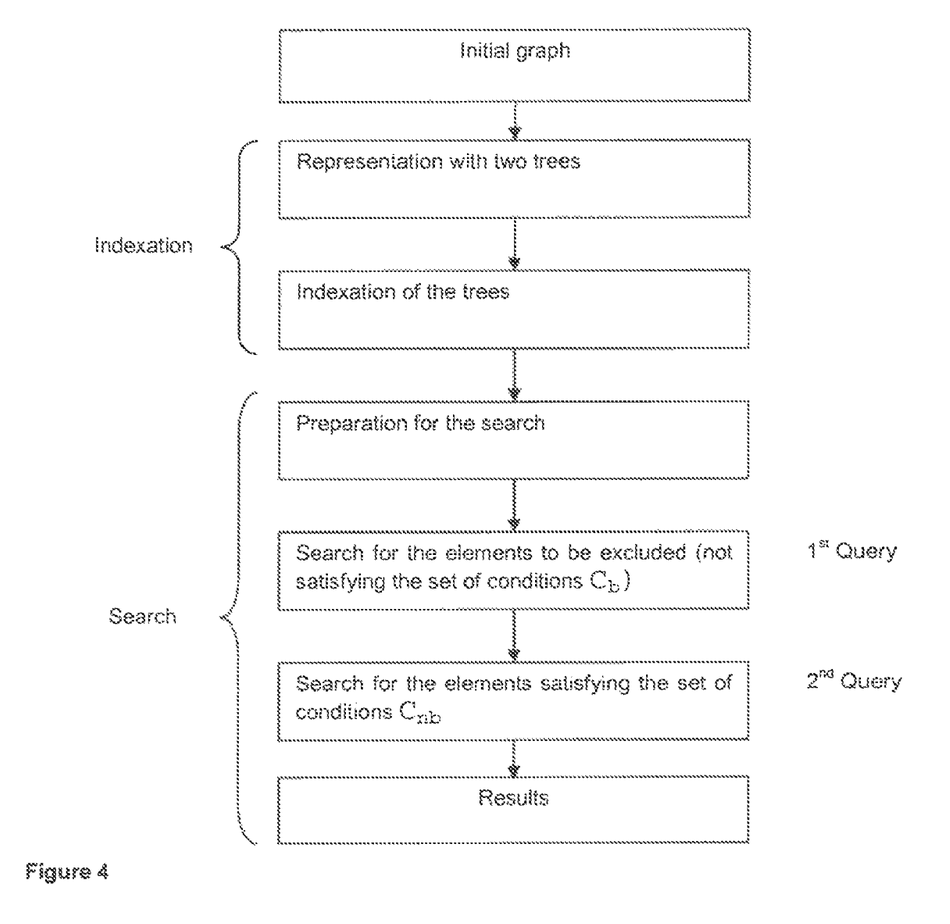

The computer system making it possible to perform a search comprises two parts, one designated the software package, the other the database management system designated DBMS, as represented in FIG. 3. The software package makes it possible to ensure a set of functionalities around the data stored in the database of the DBMS; it furthermore effects the link with the user. Hierarchical searches form part of this set of functionalities. The two systems communicate with the SQL language through a computer network. The software package is for example a system for managing documents or a configuration management system or a system for managing the life cycle of a product.

The software package supports the largest part of the processing operations such as those of the hierarchical searches since the DBMS does not make it possible to process this type of search directly; it processes only searches with a single level such as for example: which are the children of a given node, and not: which are all the descendants of a given node. A search on several levels then requires several data exchanges between the software package and the DBMS: the data are loaded and processed by the software package in tandem with the queries at one level so as to be able to carry out the following queries.

This involves constraints in terms of:
memory capacity for loading a significant volume of data,
calculation time for processing these data,
load on the network for the data exchanges between the software package and the DBMS.

Now, the software package which is not designed to manage significant data volumes, in fact constitutes a bottleneck.

The aim of the invention is to make it possible to perform a hierarchical search while loosening these constraints, whatever the depth of the graph and/or the number of elements (of nodes), and without being penalized in terms of performance.

SUMMARY OF THE INVENTION

The principle of the invention is to reduce the workload of the software package by offloading the largest part of the processing operations onto the DBMS.

The subject of the invention is a method of hierarchical searching for data satisfying at least one set of predetermined criteria C, in a directed acyclic graph comprising nodes and links between these nodes, the criteria being determined on the nodes and/or the links, the graph being stored in tables of a relational database management system able to be interrogated by a query language. It is mainly characterized in that each criterion being determined blocking or non-blocking, a blocking criterion being such that as soon as the criterion is not satisfied on a link and/or a node, the terminal node of this link respectively this node and its descendant nodes are excluded, a non-blocking criterion being such that as soon as the criterion is not satisfied on a link respectively a node, only this link respectively this node is excluded, without consequence to its descendant nodes, it comprises the following steps consisting in:

separating the set C into a set of blocking criteria $C_b$ and a set of non-blocking criteria $C_{nb}$ searching for the nodes of the graph satisfying the set of blocking criteria $C_b$, these nodes being grouped together in a set G, searching for the nodes of G satisfying the set of non-blocking criteria $C_{nb}$.

These searches are carried out by means of the query language.

In this way, the criteria are distributed into two categories depending on whether or not they are blocking, then a search is performed on this graph on the basis of these two categories.

Preferably, prior to the search steps, the CDAG is transformed into a tree, designated A, supplemented with indexation, and stored in the database management system, and the $1^{st}$ search step comprises the step consisting in performing a query by means of the query language, on the nodes of the tree A not satisfying the set of predetermined blocking criteria $C_b$, these nodes being grouped together in a set E, the $2^{nd}$ search step comprises the step consisting in performing a query by means of the query language and by using the said indexation, on the nodes of A satisfying the set of predetermined non-blocking criteria $C_{nb}$ and such that each node is not the descendant of any node of E.

In this way the hierarchical search is performed in just two queries whatever the depth of the original graph and while improving the performance.

Specifically the performance is increased relating to the data exchanges: each exchange between the package server and the DBMS inducing an overload (establishing the exchange, transferring the data onto the network, etc), these exchanges between the software package and the DBMS are reduced and forecastable since the number of queries is constant.

The processing of the data: the queries are carried out by the DBMS. This gives rise to three direct advantages. On the one hand the DBMSs have been designed to process a significant volume of data, on the other hand the processing operations are carried out just where the data are stored thereby improving the calculation times and lastly, the package server is relieved (in terms of calculation time and memory capacity) of a part of these processing operations, these being offloaded to the DBMS.

According to a characteristic of the invention, the tree is descending or ascending.

The query language is for example the SQL language.

The indexation can be an interval-based or path-based indexation.

The invention also relates to a software package such as for example a system for managing documents, or a system for managing configurations, or a system for managing the life cycle of a product, comprising means for implementing the method as described.

BRIEF DESCRIPTION OF THE DRAWINGS

Other characteristics and advantages of the invention will be apparent on reading the detailed description which follows, given by way of nonlimiting example and with reference to the appended drawings in which.

Across the figures, the same elements are labelled by the same references.

DETAILED DESCRIPTION

The first step of this search according to the invention consists in separating the set of criteria into two subsets.

Two types of criteria are distinguished in the hierarchical searches in a CDAG, "blocking" criteria and "non-blocking" criteria.

When a criterion is non-blocking, as soon as it is not satisfied on a link, only this link is excluded, without consequence to its descendants. The field "Type is documentary" is an exemplary non-blocking criterion.

When a criterion is blocking as soon as it is not satisfied on a link, the terminal node of this link is of course excluded, as are also its descendants, whatever their fields. The field "'Confidential' is 'False'>> is an exemplary blocking criterion.

Before running a hierarchical search for data, it is determined whether a criterion is or is not blocking.

The set Cd is therefore separated into a set of blocking criteria $C_b$ and a set of non-blocking criteria $C_{nb}$.

As it is difficult to establish that the blocking criteria are satisfied on the whole of the path without using recursivity, the search is indirectly "reversed" and it is performed on all the elements which do not satisfy the blocking criteria.

Searching for a node which does not satisfy a criterion amounts to seeking the node which satisfies the converse criterion. An example is described further on.

This search entails the following two steps which consist in:

searching for the nodes of the graph satisfying the set of blocking criteria $C_b$, these nodes being grouped together in a set G, searching for the nodes of G satisfying the set of non-blocking criteria $C_{nb}$.

These searches performed by means of the query language are for example carried out by recursivity.

Preferably, prior to these searches, the directed acyclic graph is transformed into a tree supplemented with indexation. There are several possible indexation strategies: so-called on-the-fly indexation, performed just before carrying out the hierarchical search, or indexation at regular intervals, in the evening for example, or else as soon as a field is modified.

The original CDAG storage database catalogues for each node the set of its children.

Knowing for each node of the graph the set of its children, this CDAG is represented in the form of a descending conditional tree. This tree is obtained in the following manner.

Each node of the tree designated destination node is associated with a link of the graph, designated origin link as well as with the terminal node of the link designated origin node.

A "dummy" root node is created, with which all the roots of the graph are associated.

Recursively, for each new destination node of the tree (associated with an origin link and its terminal node), new child nodes are created, respectively associated with all the links that start from the origin node and are coupled to their terminal node.

Thus, the nodes which have n parents in the original graph are duplicated at least n times with their descendants in the destination tree. A node of the graph can be associated with several nodes of the tree. A node of the tree thus represents a node of the graph with one of its incoming links. It is therefore possible to merge the concept of link and of node in the tree. The fields carried by the link can therefore be applied to the terminal node in the tree.

Figure 5A:
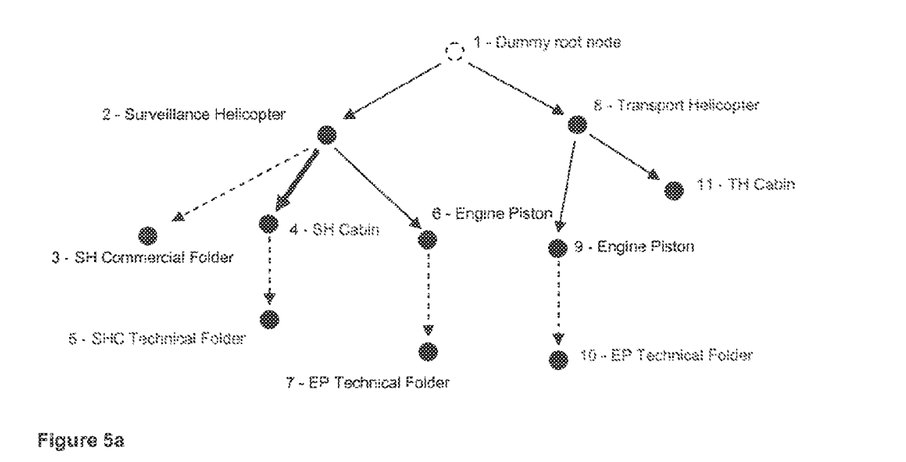
FIGS. 5a and 5b represent respectively the descending tree and the ascending tree arising from the graph of FIG. 1, FIG. 6a exhibits a table of the tree of FIG. 5a supplemented with an interval-based and path-based indexation, and FIG. 6b a linear representation of the intervals obtained.

Represented in FIG. 5a is the descending tree created on the basis of the CDAG of FIG. 1.

Figure 6A:
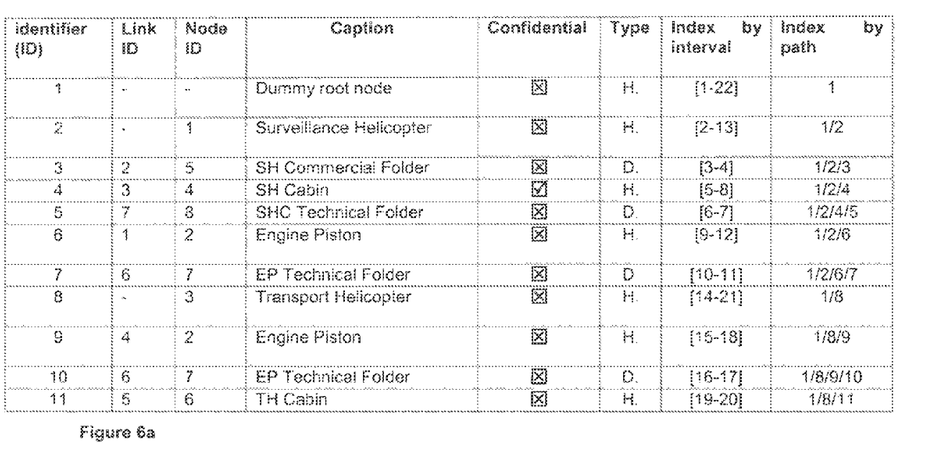

FIG. 6a is the representation in table form of the descending tree of FIG. 5a. In this table, the identifier of the node (ID Node) makes reference to the identifier (ID) of FIG. 2b, the identifier of the link (ID Link) to that of FIG. 2a. The fields of the table of FIG. 2b are carried over to this table of FIG. 6a.

Figure 5B:
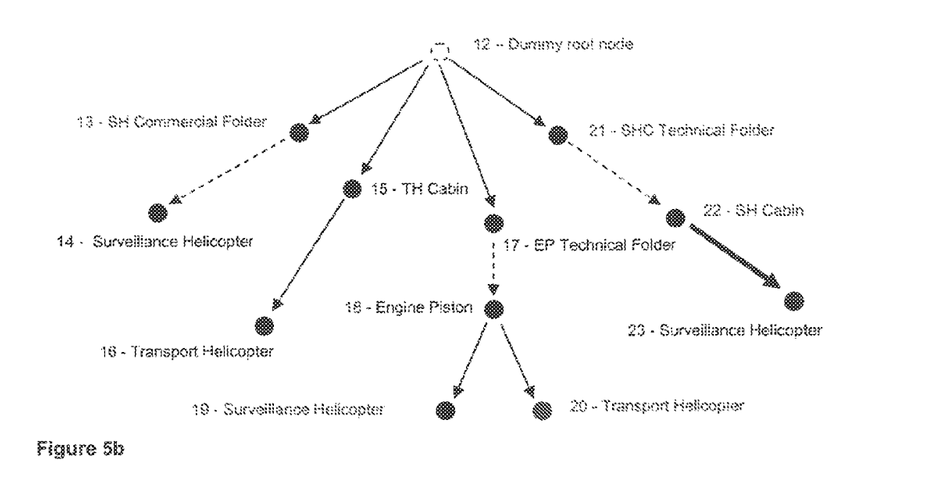

In the same manner, the CDAG is represented in the form of an ascending tree by reversing the senses of all the links of the CDAG. Represented in FIG. 5b is the ascending tree created on the basis of the DGAC of FIG. 1.

The descending tree is used to perform descending searches and the ascending tree for ascending searches. A descending search corresponds to a query of the type "contains" and an ascending search corresponds to a query of the type "is contained".

Once created, each tree is then indexed according to an indexation procedure. Indexation on a tree associates an index with each node. Among these indexation procedures may be cited interval-based indexation or path-based indexation. Indexation makes it possible to know easily whether a node is a descendant of another node: it suffices to perform a simple comparison of the indices of the two nodes. This comparison entails elementary operations of the SQL language such as 'upper', 'lower' for intervals or 'begins with' for paths. For example, in the case of interval-based indexation, a node P whose interval is [Plow, Pupp] is descendant of a node D whose interval is [Dlow, Dupp] if the interval of P is included in the interval of D i.e. Dlow<Plow and Pupp<Dupp: the comparison of the indices can therefore be translated with the aid of elementary 'upper' and 'lower' operations. In the tree indexed by interval of FIG. 6a, if one compares the indices by intervals [5, 8] and [6, 7], respectively intervals of the nodes 4 (SH Cabin) and 5 (SHC Technical Folder), it is possible to deduce therefrom that node 5 is a descendant of node 4 since the interval [5, 8] contains the interval [6, 7]: specifically, we have 5<6 and 7<8. Likewise, if one compares the indices by path '1/2/4' and '1/2/4/5' of the same nodes 4 (SH Cabin) and 5 (SHC Technical Folder), the conclusion is identical, since the path '1/2/4/5' begins with '1/2/4'.

Conversely, for nodes 4 (SH Cabin) and 6 (Engine Piston) whose intervals are [5, 8] and [9, 12], no interval contains the other (5<9 but 12>8), there is therefore no relationship between these two nodes. Finally, if one compares the indices by path '1/2/4' and '1/2/6' of the respective nodes 4 (SH Cabin) and 6 (Engine Piston), none of the paths begins with the other, therefore the same result is obtained.

The construction of the indices of a tree based on paths is simple: the index of a node is constructed by adding the identifier of the node to the index of the parent. Thus, for example the index of node 5 (SHC Technical Folder) is constructed on the basis of the index of the parent node '1/2/4' to which 5 is added to give '1/2/4/5'. The root node not having any parent, its index is simply its identifier.

To index a tree based on intervals, for each node an interval is defined such that the interval of each child is included in the interval of the parent.

The indexation is obtained in the following manner. For each node, if this node has no siblings, the lower bound is taken to be the lower bound of the parent to which 1 is added, otherwise the lower bound is taken to be the maximum of the upper bounds of its already indexed siblings, to which 1 is added. The upper bound is then Bupp=Blow+2*N+1 where N is the number of descendants of the node.

The intervals of all the descendants of a node are then included in the interval of the node of the parent by construction.

This indexation will be illustrated on the example of the tree of FIG. 5a. The bounds of the interval of the root node for which N=10, are:

[1, 1+2×10+1] i.e. [1, 22].

For the Surveillance Helicopter node, we have N=5 and the bounds are therefore:

[1+1, 2+2×5+1] i.e. [2, 13].

And so on.

Figure 6B:
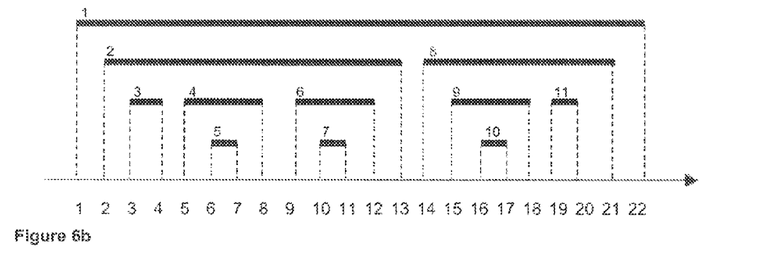

A linear representation of the results obtained is illustrated in FIG. 6b. Each line corresponds to an interval of FIG. 6a, the numbers written above each line are the identifiers.

The choice of an indexation procedure is a compromise between how fast the indices are constructed, the memory space taken by the indices in the DBMS and the performance of the comparisons during the searches. For example, path-based indexation, the simplest is constructed faster than interval-based indexation but performs less well than the latter as regards the memory space used and as regards the performance of the comparisons.

The search itself is now considered; it is therefore carried out on the basis of an indexed tree.

A priori, a search for the nodes satisfying a set of predetermined criteria C on an indexed descending tree makes it possible to obtain in a single query the set of nodes satisfying this set of criteria but does not make it possible to ensure that the set of criteria C is valid on the whole of the path which leads from a parent node to a descendant node.

Specifically, a search for the descendants of the node of the Surveillance Helicopter of the tree of FIG. 5a, satisfying the criterion "the 'Confidential' field is 'False'>> then provides the result: Surveillance Helicopter, SH Commercial Folder, Engine Piston, EP Technical Folder and the SHC Technical Folder. Only the SH Cabin node is eliminated, while one wishes to also eliminate the SHC Technical Folder the SHC Technical Folder node which represents the "SH Cabin→SHC Technical Folder" link does indeed satisfy the criterion, but not its parent, the SH Cabin node which represents the "Surveillance Helicopter→SH Cabin" link.

In the indexed tree, each node corresponding to a link and a node of the graph, searching for nodes and links in the graph is therefore equivalent to searching for nodes in the tree.

As indicated previously, the search is indirectly "reversed" and it is performed on all the elements which do not satisfy the blocking criteria.

Searching for a node which does not satisfy a criterion amounts to seeking the node which satisfies the converse criterion.

This property will be illustrated on the example of FIG. 5a, by performing a search with a blocking criterion: searching for the nodes which do not satisfy the criterion "the 'Confidential' field is 'False'>> amounts to seeking the nodes which satisfy the converse criterion "the 'Confidential' field is 'True'". "The Confidential field is false" is not satisfied (="the Confidential field is true" is satisfied) is a blocking criterion. The nodes of the Surveillance Helicopter satisfying "the 'Confidential' field is 'True'" are the confidential data of the Surveillance Helicopter. The SH Cabin node which represents the "Surveillance Helicopter→SH Cabin" link is confidential and therefore excludes its descendants, in this instance the SHC Technical Folder although this descendant satisfies the criterion "the 'Confidential' field is 'False'>>.

The results of the search on the nodes of the Surveillance Helicopter not satisfying the blocking criterion "the 'Confidential' field is 'False'>> therefore satisfying "the 'Confidential' field is true") are therefore the SH Commercial Folder, the Engine Piston and the EP Technical Folder.

In the example of FIG. 5a, the result of a search with a non-blocking criterion "the 'Type' field is 'Documentary'" on the Surveillance Helicopter is: the SH Commercial Folder, the SHC Technical Folder and the EP Technical Folder, whereas neither the "Surveillance Helicopter→Engine Piston" link from which the EP Technical Folder descends, nor the "Surveillance Helicopter→SH Cabin" link from which the SHC Technical Folder descends are "documentary" links and therefore do not satisfy the specified criterion.

It is also possible to combine the two types of criteria in a search; the result is the intersection of the results of each search pertaining to a single criterion. A search combining the two previous criteria, "the 'Confidential' field is 'False'>> as blocking criterion and "the 'Type' field is 'Documentary'" as non-blocking criterion therefore returns the intersection of the previous two results i.e.: the SH Commercial Folder and the EP Technical Folder. The Engine Piston is thus eliminated by the non-blocking criterion and the SH Cabin and its descendant, the SHC Technical Folder, are eliminated by the blocking criterion.

More precisely, let A be the set of nodes to be searched for. In the example of FIG. 5a, A therefore comprises the Surveillance Helicopter, the SH Commercial Folder, the SH Cabin, the SHC Technical Folder, the Engine Piston and the EP Technical Folder.

Let I be the set of nodes for which all the links between the node and the root satisfy the set of "blocking" criteria. In the example of FIG. 5a, I therefore comprises the Surveillance Helicopter, the SH Commercial Folder, the Engine Piston and the EP Technical Folder.

Let E be the set of nodes which do not satisfy the "blocking" criteria. In the example of FIG. 5a, E reduces to the single node SH Cabin.

Let F be the set E extended with the descendants of all the elements of E. F is the set complementary to I: I∩F= and I∪F=A. In the example of FIG. 5a, F consists of two elements, the SH Cabin and the SHC Technical Folder.

Let H be the set of nodes which satisfy the "non-blocking" predetermined criteria. In the example of FIG. 5a, H contains the SH Commercial Folder, the SHC Technical Folder and the EP Technical Folder.

Let S be the result of the search.

Then S=H∩I(principle of the direct procedure). Now, I and F are complementary therefore I=A−F. By replacing I in the direct procedure, we obtain S=H∩(A−F).

The aim of the invention is an effective procedure for determining (A−F). The first query determines E, the second H∩(A−F).

The representation of the conditional tree in its indexed form makes it possible to exclude in a single query the descendants of a node not satisfying a blocking criterion.

This first query pertains to all the nodes of A which do not satisfy the set of blocking criteria: a set of nodes E of invalid index is obtained.

F is the set of descendants of E; by construction of the indexed tree, F therefore corresponds to all the nodes N, the comparison of whose index with the index of one of the nodes N' of E shows a descent relationship from N' to N. In the case of an interval-based indexation, the nodes of F are the nodes whose interval is included in one of the intervals of the nodes of E. Thus A−F is the set of nodes whose interval is not included in any of the intervals of E. In the case of a path-based indexation, the nodes of F are the nodes whose path begins with one of the paths of E. In the same manner, A−F is the set of nodes whose path does not begin with any of the paths of E.

A−F is therefore determined without even evaluating F.

This set E is therefore the set of indices to be excluded. Applied to the example of FIG. 5a, the set of nodes of E which do not satisfy the blocking criterion "the 'Confidential' field is 'False'" comprises solely the SH Cabin node: its index, the interval [5, 8] or the path '1/2/4' is therefore the single index to be excluded.

The second query pertains to the nodes of A−F which satisfy the set of non-blocking criteria to obtain H∩(A−F). In the case of the interval-based indexation, this amounts to seeking the nodes whose intervals are not included in any of the intervals of the nodes of E and satisfying the set of non-blocking criteria on all the nodes of A. Consequently, the SHC Technical Folder is not returned since its interval [6, 7] is included in the interval of one of the nodes of E: [5, 8], the interval of the SH Cabin. In the same manner for the path-based indexation, H∩(A−F) is the set of nodes whose path does not begin with any of the paths of E. The SHC Technical Folder is not returned since its path '1/2/4/5' begins with one of the paths of E: '1/2/4', the path of the SH Cabin. The results of the search for the nodes of A−F satisfying the documentary criterion are therefore the SH Commercial Folder node and the EP Technical Folder node. This result is indeed the same as that obtained previously.

Figure 7:
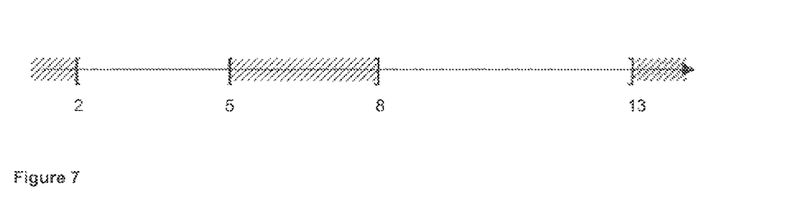
FIG. 7 represents in a linear manner the search intervals.

Represented in FIG. 7 is a linear representation of the intervals, the part to be excluded being hatched.

The ascending searches are done in the same manner in two queries on the indexed ascending tree.

The invention claimed is:

1. A method implemented by a computer programmed as a database search apparatus that performs hierarchical searching for data satisfying at least one set of predetermined criteria C, in a directed acyclic graph including nodes and links between said nodes and which is stored in tables of a relational database management system able to be interrogated by a query language, the criteria being determined on the nodes and/or the links, wherein each criterion is determined as a blocking criterion in which as soon as the blocking criterion is not satisfied on a link or a node, the node or the terminal node of the link and its descendant nodes are excluded, or a non-blocking criterion in which as soon as the non-blocking criterion is not satisfied on a link or a node, only the node or the terminal node of the link is excluded, without consequence to its descendant nodes, the method comprising:

separating, by the database search apparatus, the set of predetermined criteria C into a set of blocking criteria $C_b$ and a set of non-blocking criteria $C_{nb}$;

transforming the directed acyclic graph into a tree A supplemented with indexation, and storing the tree in the database management system;

searching, with the query language, for the nodes of the graph satisfying the set of blocking criteria $C_b$, these nodes being grouped together in a set G; and searching, with the query language, for the nodes of G satisfying the set of non-blocking criteria $C_{nb}$, wherein the first searching step comprises performing a query with the query language, on the nodes of the tree A not satisfying the set of predetermined blocking criteria $C_b$, these nodes being grouped together in a set E, the second searching step comprises performing a query with the query language by using the said indexation on the nodes of A satisfying the set of predetermined non-blocking criteria $C_{nb}$ such that each node is not the descendant of any node of E.

2. The method of hierarchical searching for data according to claim 1, wherein the tree A is descending or ascending.

3. The method of hierarchical searching for data according to claim 1, wherein the indexation is an interval-based or path-based indexation.

4. The method of hierarchical searching for data according to claim 1, wherein the query language is the SQL language.

5. The method of claim 1, further comprising sorting the nodes of G satisfying the set of non-blocking criteria using a pagination process.

6. A system for hierarchical searching for data satisfying at least one set of predetermined criteria C, in a directed acyclic graph including nodes and links between said nodes, the criteria being determined on the nodes and/or the links, wherein each criterion is determined as a blocking criterion in which as soon as the blocking criterion is not satisfied on a link or a node, the node or the terminal node of the link and its descendant nodes are excluded, or a non-blocking criterion in which as soon as the non-blocking criterion is not satisfied on a link or a node, only the node or the terminal node of the link is excluded, without consequence to its descendant nodes the system, comprising:

a memory storing, in tables, the directed acyclic graph; and a computer programmed to:

separate the set of predetermined criteria C into a set of blocking criteria $C_b$ and a set of non-blocking criteria $C_{nb}$, transform the directed acyclic graph into a tree A supplemented with indexation, and to store the tree in the database management system;

search, with the query language, for the nodes of the graph satisfying the set of blocking criteria $C_b$, these nodes being grouped together in a set G; and search, with the query language, for the nodes of G satisfying the set of non-blocking criteria $C_{nb}$, wherein the computer is programmed to perform a query with the query language, on the nodes of the tree A not satisfying the set of predetermined blocking criteria $C_b$, these nodes being grouped together in a set E, and to perform a query with the query language by using the said indexation on the nodes of A satisfying the set of predetermined non-blocking criteria $C_{nb}$ such that each node is not the descendant of any node of E.

* * * * *